(No Model.)
W. WATKINS.
THILL COUPLING.
No. 358,708. Patented Mar. 1, 1887.
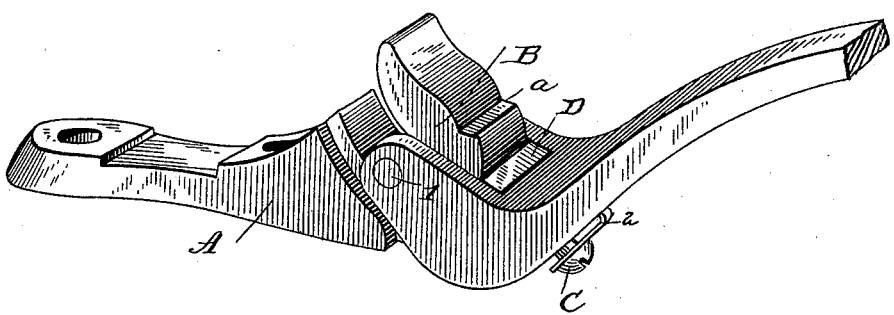
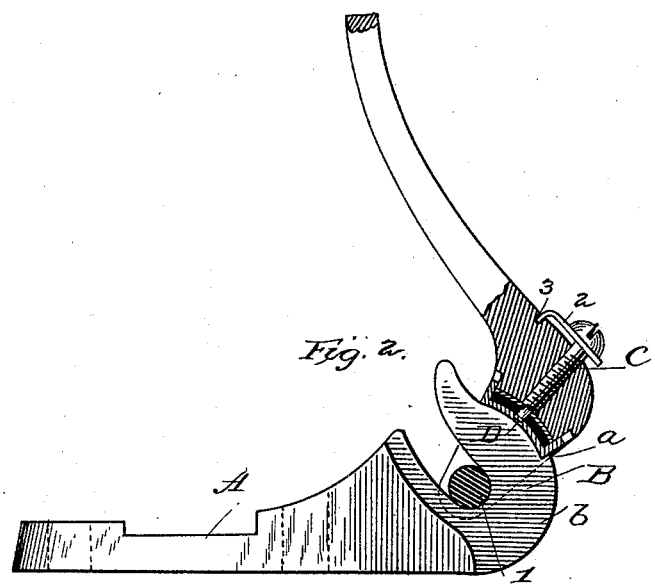
Attest:
Walter Donaldson
Frank L. Middleton
Inventor:
Wm Watkins
by Ellis Spear
Atty.

United States Patent Office.

WILLIAM WATKINS, OF WATERLOO, IOWA.

THILL-COUPLING.

SPECIFICATION forming part of Letters Patent No. 358,708, dated March 1, 1887.

Application filed January 15, 1887. Serial No. 224,471. (No model.)

*To all whom it may concern:*

Be it known that I, WILLIAM WATKINS, of Waterloo, in the county of Black Hawk and State of Iowa, have invented a new and useful Improvement in Thill-Couplings; and I do hereby declare that the following is a full, clear, and exact description of the same.

My invention is an improved device for attaching thills to axles; and its object is to provide a coupling and anti-rattler, to operate when the shafts are in use, and also to provide means by which, when the shafts are not in use, they may be held up out of the way.

My invention therefore consists in the devices and combination of devices hereinafter described and particularly claimed.

In the accompanying drawings, Figure 1 shows the parts and their position while the shafts are in use. Fig. 2 is a similar view, showing the position of the shafts when not in use.

In these drawings, A is the piece which is secured to the axle, and is fastened thereto by clips in the ordinary manner. This piece A is formed with a hook-shaped end, B, to which the thill-iron is adapted to be secured. The thill-iron E, as shown, is bifurcated, and the ends of the prongs are connected by the bolt 1, and this bolt may be put on after the thill is made, or may be formed integral therewith, and when the thill-iron is put in place, the bolt bears in the hollow of the hook-shaped end. A set-screw, C, is passed through the lower part of the thill-iron, and has attached to its inner end a metallic plate, D, which plate it is adapted to adjust. It will be understood that it is not necessary that the metallic plate should be attached to the screw, as the screw may simply bear against said plate. The hooked end B of the piece A is notched at the point *a*, near its upper end, and from that point to the end is reduced in thickness. Below this point *a* the portion *b* of the hooked end of the said piece A is the arc of a circle struck from the center of the bolt 1 as a center; and when the thill-iron is put in place, by loosening the set-screw the said iron is allowed to move freely in its bearings, or by tightening the said screw the metallic plate D is forced against the curved portion *b* of the piece A, so that the bolt 1 is crowded against its bearing, and thus rattling is prevented.

It will be readily seen that since the part *b* is the arc of a circle, the same force will be exerted upon the bolt 1 to prevent rattling, no matter at what point of the circumference of said arc the pressure is applied.

If desired, a piece of rubber or other elastic material may be placed back of the metallic plate D, in order to prevent rattling on that side of the hooked end B.

When it is not desired to use the shafts, in order to hold them out of the way it is simply necessary to raise the thills to such a point that the plate D will no longer bear against the part *b*, and then the metallic plate will bear in the notch *a*, and thus prevent the thills from falling. It will be observed that with my device the thills are very easily removed or attached.

To the head of the screw I have attached a spring, 2, adapted to fit into holes 3 in the thill-iron, thus preventing the screw from turning or getting loose.

I claim as my invention—

1. In an anti-rattler thill-coupling, the combination, with the piece A, having a hooked end provided with an inclined slot and with the lower portion of the outer periphery formed on a curve, of the thill-iron having an opening adapted to the hooked end of the piece A and a bearing-plate in the rear of the opening adapted to bear against the curved surface of the piece A, substantially as described.

2. In an anti-rattler thill-coupling, the combination, with the piece A, having a hooked end provided with an inclined slot and with the lower portion of the outer periphery formed on a curve, of the thill-iron having an opening adapted to the hooked end of the piece A, and a bearing-plate in the rear of the opening adapted to bear against the curved surface of the piece A, and means for adjusting the bearing-plate, substantially as described.

3. In an anti-rattler thill-coupling, the combination, with the piece A, having a hooked end provided with an inclined slot, and with the lower portion of the outer periphery formed on a curve, and with a notch in the upper portion thereof, of the thill-iron having an opening adapted to the hooked end of the piece A, a bearing-plate in the rear of the opening adapted to bear against the curved surface of the piece A, and means for adjusting the bearing-plate so that it will engage with the said notch, substantially as described.

4. In combination with the hooked end of the piece A, provided with the inclined slot, and having the curved portion $b$ and the notch $a$, the thill-iron provided with the bolt adapted to bear in the inclined slot, the plate D, bearing against the portion $b$, said plate being adjustable by means of the set-screw C, whereby rattling is prevented, all substantially as described.

5. In an anti-rattler thill-coupling, in combination, the hooked end of the piece A, having the curved lower portion of the outer periphery and notched upper portion, the thill-iron carrying the set-screw, and the adjustable plate bearing against the portion $b$, whereby, upon raising the thill-iron to such a height that the plate no longer bears upon the portion $b$, it will bear in the notch $a$, and thus hold the thills in their upright position, substantially as described.

In testimony whereof I have signed my name to this specification in the presence of two subscribing witnesses.

WILLIAM WATKINS.

Witnesses:
JOSEPH WATKINS,
M. T. OWENS.